US011808632B2

(12) United States Patent
Wang et al.

(10) Patent No.: US 11,808,632 B2
(45) Date of Patent: Nov. 7, 2023

(54) SELF-COOLED FOUR-SHAFT TURBINE PANORAMIC TEMPERATURE MEASURING DEVICE

(71) Applicant: University of Electronic Science and Technology of China, Sichuan (CN)

(72) Inventors: Chao Wang, Sichuan (CN); Jing Jiang, Sichuan (CN); Yi Niu, Sichuan (CN); Anmei Qiu, Sichuan (CN); Zezhan Zhang, Sichuan (CN); Peifeng Yu, Sichuan (CN); Guiyun Tian, Sichuan (CN); Shan Gao, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 285 days.

(21) Appl. No.: 17/387,527

(22) Filed: Jul. 28, 2021

(65) Prior Publication Data
US 2022/0099496 A1 Mar. 31, 2022

(30) Foreign Application Priority Data

Aug. 12, 2020 (CN) .......................... 202010806727.4

(51) Int. Cl.
*G01J 5/00* (2022.01)
*G01J 5/04* (2006.01)

(52) U.S. Cl.
CPC ............. *G01J 5/0088* (2013.01); *G01J 5/048* (2013.01); *F05D 2260/232* (2013.01)

(58) Field of Classification Search
CPC ... G01J 5/0088; G01J 5/048; F05D 2260/232; G01K 1/146
(Continued)

(56) References Cited

U.S. PATENT DOCUMENTS

| 8,992,081 | B2 * | 3/2015 | Ireland | G01K 13/02 374/208 |
| 10,670,467 | B2 * | 6/2020 | Wang | G01K 1/024 |

(Continued)

FOREIGN PATENT DOCUMENTS

| CN | 106872049 A | * | 6/2017 | ............ G01J 5/0022 |
| CN | 111103059 A | * | 5/2020 | ................ G01J 5/00 |
| DE | 19542464 A1 | * | 5/1997 | .............. G01J 5/041 |

*Primary Examiner* — Natalie Huls

(57) ABSTRACT

A four-shaft panoramic scanning temperature measuring device with a circulating water-cooling device is provided, which not only improves the working reliability of the probe, but also increases the overall flexibility and scanning measurement efficiency. The circulating water-cooling device is self-cooled. Compared with the conventional single-circulation water-cooling way, the design of five cooling cavities can achieve higher circulating water-cooling efficiency. The four-shaft structure includes a shaft structure for translation, a shaft structure for rotation, a shaft structure for swinging, and a shaft structure with coaxial sight pipe and light pipe. The design of the four-shaft structure is able to panoramically scan the high-temperature components inside the turbine. The temperature measuring device integrates functions of cooling, swinging, translating and rotating together, which solves problems of large size and complex control of the conventional temperature measuring device.

1 Claim, 3 Drawing Sheets

(58) Field of Classification Search
USPC .......................................................... 374/132
See application file for complete search history.

(56) References Cited

U.S. PATENT DOCUMENTS

| | | | |
|---|---|---|---|
| 10,697,317 B2* | 6/2020 | Bailey | F01D 25/24 |
| 2014/0063227 A1* | 3/2014 | Baleine | G01N 21/95 |
| | | | 348/82 |
| 2018/0348070 A1* | 12/2018 | Wang | G01K 1/14 |

* cited by examiner

SELF-COOLED FOUR-SHAFT TURBINE PANORAMIC TEMPERATURE MEASURING DEVICE

CROSS REFERENCE OF RELATED APPLICATION

The application claims priority under 35 U.S.C. 119(a-d) to CN 202010806727.4, filed Aug. 12, 2020.

BACKGROUND OF THE PRESENT INVENTION

Field of Invention

The present invention relates to a field of aero engine, and more particularly to a four-shaft turbine panoramic temperature measuring device with a circulating water-cooling device.

Description of Related Arts

During the development of aviation industry, the aero engine is always the bottleneck that restricts the domestic military airplane. Under the modern engine development background of higher Mach number and higher thrust-weight ratio, temperature is an important measurement parameter in the engine. In the hot flow channel of the engine, the turbine hot-end components (such as rotor, stator blade and turbine casing) have the highest temperature and are most easily fractured, thereby causing the engine failure. Thus, accurate measurement of the surface temperature of the turbine hot-end components is particularly important for monitoring the condition of the engine and improving the reliability thereof. In the modern turbine temperature measurement technology, radiation temperature measurement is widely applied, which mainly uses the infrared radiation temperature measuring device to collect, convert, process and transmit the surface optical signal, and finally restores the actual temperature data. There are many institutes researching the infrared temperature measuring device. Generally, the radiation temperature measuring device is arranged outside the engine casing, and the turbine blade surface is observed through the casing hole; the driving system drives the temperature measuring device to move, so as to scan different position points of the blade surface; and the data collected through scanning will be transmitted to the data collecting and processing system. Conventionally, most of the infrared radiation temperature measuring devices for the turbine are only capable of single drive scanning, but cannot complete scanning and temperature measuring of multiple components inside the turbine at the same time. Moreover, the temperature of the working environment of the turbine components is high, while most of the temperature measuring devices are not equipped with the active cooling structure to ensure the measurement reliability. Based on the above situation, the present invention provides a self-cooled four-shaft turbine panoramic temperature measuring device, which realizes temperature measurement of multiple hot-end components inside the turbine.

SUMMARY OF THE PRESENT INVENTION

An object of the present invention is to provide a self-cooled four-shaft turbine panoramic temperature measuring device, so as to solve problems of low reliability, low efficiency and single function of a conventional temperature measuring device for turbine components.

The present invention adopts technical solutions as follows.

A self-cooled four-shaft turbine panoramic temperature measuring device comprises: a probe, a cooling device, a driving device and a probe casing, wherein: one end of the probe extends into the probe casing, and the other end of the probe is protruding; the cooling device is arranged at a connection part between the probe and the probe casing, for cooling a front end of the probe; the cooling device is mounted with a flange, for fixing the whole temperature measuring device; the driving device is arranged inside the probe casing, for driving the probe to move; the probe comprises a probe cover, a sight pipe, a light pipe, and an optical lens set, wherein: the probe cover is arranged at an outermost portion of the probe, for protecting internal optical components of the probe; the sight pipe is arranged inside the probe cover, and the light pipe is welded inside the sight pipe; the sight pipe further protects the internal light pipe, which prevents the light pipe from directly contacting with a high-temperature airflow and contaminated particles; and the optical lens set is fastened inside the light pipe to form an optical system of a detection device, so that light is introduced from a turbine blade and detected; a rear end of the probe is connected to the driving device; the driving device comprises a swinging drive module, a rotation drive module, and a translational drive module, wherein: the rotation drive module drives the swinging drive module and the probe; and the translational drive module drives the rotation drive module, the swinging drive module and the probe; the optical lens set comprises a mirror, wherein the mirror is fixed at the front end of the probe through a hinge structure; the cooling device is arranged at a connection part between the probe and the driving device, for preventing the driving device from an influence of the high-temperature airflow as well as cooling a surface of the probe in time during working of the probe, thereby protecting the internal light pipe; the probe casing is a square casing, for fixing a four-shaft probe structure with the cooling device, so as to form an integrated infrared measuring device, which facilitates mounting and measurement control.

The cooling device comprises water-cooling pipelines, a connecting plate, a mounting flange plate, a cooling stage and a cooling pond, wherein: the water-cooling pipelines are connected to the cooling stage; each of the water-cooling pipelines comprises an inlet pipe and an outlet pipe, and totally five water-cooling pipelines are arranged on one side of the cooling stage; correspondingly, one end of each water-cooling pipeline is connected to a cooling cavity of the cooling stage where cooling water is circulated; adjacent cooling cavities are separated with a separation column; and the other end of each water-cooling pipeline is connected to the cooling pond. Through the water-cooling pipelines, hot water in each cooling cavity is pumped into the cooling pond and cooled; the cooled water is pumped into each cooling cavity again to keep cooling the probe, so that a water-cooling circulation is formed for continuously cooling the probe. The cooling pond is separated into five independent parts which are respectively connected to the five water-cooling pipelines to provide five water-cooling circulations at the same time, which ensures that the cooling device can sufficiently cool the probe and realize higher efficiency than a single water-cooling circulation device. One end of the cooling stage is connected to the connecting plate which connects the cooling device with the probe casing; and the other end of the cooling stage is connected to the mounting flange plate which mounts the whole temperature measuring device on an engine casing.

The translational drive module comprises a high-inertia servo motor, a plum coupling, a screw, a sliding table, limit switches and a sliding table base, wherein: one end of the plum coupling is connected to an output shaft of the high-inertia servo motor, and the other end of the plum coupling is connected to one end of the screw; the other end of the screw passes through the sliding table; the sliding table is placed in the sliding table base; the limit switches are arranged on inner sides of the sliding table base, respectively corresponding to initial and final positions of translation of the sliding table; the high-inertia servo motor drives the screw to rotate through the plum coupling, and the sliding table axially moves along the screw; once the sliding table contacts with the limit switches, a reverse drive is given to the high-inertia servo motor immediately, so that the sliding table moves reversely. The translational drive module is mainly used for driving the probe to radially scan turbine components.

The rotation drive module comprises a rotation table, a rotation motor, a rotation table mounting plate, a rotation optical sleeve, an infrared detector and a detector mounting plate, wherein: a lower surface of the rotation table mounting plate is fixed on the sliding table of the translational drive module; the rotation motor is arranged on an upper surface of the rotation table mounting plate at an edge of one side along a movement direction of the sliding table of the translational drive module; the infrared detector is arranged on a rest part of the upper surface of the rotation table mounting plate through the detector mounting plate; a detection point of the infrared detector is located on a translational axis of the rotation table mounting plate; the rotation table has a hollow circular portion, and a gear engagement component is arranged inside the hollow circular portion; one side of the hollow circular portion of the rotation table is connected to an output shaft of the rotation shaft, and the rotation motor drives the gear engagement component inside the rotation table to rotate; a disc flange is arranged at the other side of the rotation table, and a light transmitting hole is provided at a center of the disc flange; when the rotation motor drives the gear engagement component to rotate, the disc flange rotates with the gear engagement component; the disc flange is connected to the swinging drive module through bolts; one end of the rotation optical sleeve is connected to the infrared detector, and the other end of the rotation optical sleeve passes through the hollow circular portion of the rotation table. Preferably, the rotation optical sleeve is arranged behind the rotation table, and a plano-convex focusing lens is fastened inside the rotation optical sleeve, for limiting a light path and introducing light into a detection unit of the infrared detector; an external thread of the rotation optical sleeve matches with an inner thread of the infrared detector; and a light path of the whole optical system is coaxial. Optionally, the infrared detector can be replaced with an infrared detector array, so as to measure temperatures of multiple points at the same time and improve working efficiency. The rotation drive module is used for driving the probe to circumferentially scan the turbine components.

The swinging drive module comprises a motor gear component, a swinging table, an optical adaptor, a swinging connecting flange, a push rod, and a push rod assembling part, wherein: one end of the swinging connecting flange is fixed on the disc flange of the rotation drive module, and the other end of the swinging connecting flange is fixed with a probe flange through a cushion; the probe flange is fixed with the probe; a light exit end of the probe is connected to the rotation optical sleeve of the rotation drive module through the optical adaptor; the probe, the optical adaptor, the rotation optical sleeve and the infrared detector are coaxially arranged; an output section of the motor gear component is connected to the swinging table, so that the swinging table is movable along a length direction of the probe; the swinging table is connected to one end of the push rod, and the other end of the push rod is connected to the push rod assembling part; the push rod is arranged inside the probe cover; the push rod assembling part is connected to the mirror through a push rod pin. The swinging drive module is used for driving the probe to radially scan the turbine components in a small angle.

Compared with the prior art, the present invention has beneficial effects as follows.

The four-shaft panoramic scanning temperature measuring device with the circulating water-cooling device provided by the present invention not only improves the working reliability of the probe, but also increases the overall flexibility and scanning measurement efficiency. The circulating water-cooling device is self-cooled. Compared with the conventional single-circulation water-cooling way, the circulating water-cooling efficiency with five cooling cavities is higher. The design of the four-shaft structure is able to panoramically scan the high-temperature components inside the turbine. The four-shaft structure comprises a shaft structure for translation, a shaft structure for rotation, a shaft structure for swinging, and a shaft structure with coaxial sight pipe and light pipe. The temperature measuring device integrates functions of cooling, swinging, translating and rotating together, which solves problems of large size and complex control of the conventional temperature measuring device.

Figure 1:
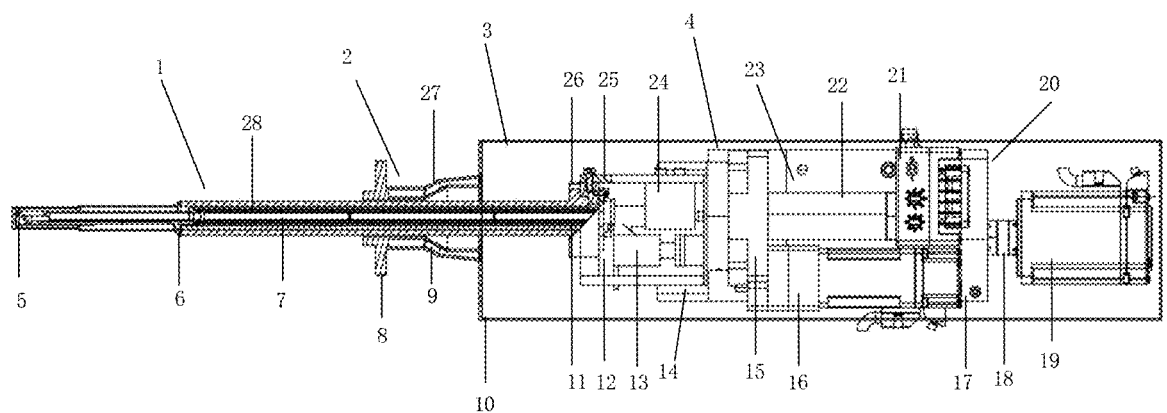
FIG. 1 shows a top view of a whole temperature measuring device according to the present invention, wherein a probe is cross-sectioned.

In figures: 1: probe; 2: cooling device; 3: probe casing; 4: driving device; 5: mirror; 6: probe cover; 7: light pipe; 8: mounting flange plate; 9: water-cooling pipeline; 10: connecting plate; 11: push rod; 12: swinging table; 13: motor gear component; 14: swinging drive module; 15: rotation table; 16: rotation motor; 17: rotation table mounting plate; 18: plum coupling; 19: high-inertia servo motor; 20: translational drive module; 21: infrared detector; 22: rotation optical sleeve; 23: rotation drive module; 24: optical adaptor; 25: swinging connecting flange; 26: probe flange; 27: cooling stage; 28: sight pipe; 29: separation column; 30: cooling pond; 31: push rod pin; 32: mirror pin; 33: push rod assembling part; 34: detector connecting plate; 35: disc flange; 36: screw; 37: sliding table; 38: sliding table base; and 39: limit switch.

DETAILED DESCRIPTION OF THE PREFERRED EMBODIMENT

A through-hole is provided on a probe cover near a top end, for transmitting light and serving as an outlet channel of cool air; a mirror is arranged inside the probe cover, and a surface of the mirror is opposite to the through-hole; radiated light from a blade surface is reflected into a sight pipe through the mirror surface; the sight pipe is a hollow Inconel-600 pipe and arranged inside the probe cover behind the mirror, for protecting and separating the internal light pipe; an optical lens set is fastened inside the light pipe, for transmitting an optical signal to a rear end of the temperature measuring device with a minimum attenuation; a probe flange is arranged at a top part of the probe, for connecting with the swinging drive module at the rear end.

The probe is equipped with a self-cooling device; such cooling device comprises water-cooling pipelines, a connecting plate, a mounting flange plate, a cooling stage and a cooling pond, wherein: the water-cooling pipelines are connected to the cooling stage; each of the water-cooling pipelines comprises an inlet pipe and an outlet pipe, and totally five water-cooling pipelines are arranged on one side of the cooling stage; correspondingly, one end of each water-cooling pipeline is connected to a cooling cavity of the cooling stage where cooling water is circulated; adjacent cooling cavities are separated with a separation column; and the other end of each water-cooling pipeline is connected to the cooling pond. Through the water-cooling pipelines, hot water in each cooling cavity is pumped into the cooling pond and cooled; the cooled water is pumped into each cooling cavity again to keep cooling the probe, so that a water-cooling circulation is formed for continuously cooling the probe. The cooling pond is separated into five independent parts which are respectively connected to the five water-cooling pipelines to provide five water-cooling circulations at the same time.

The swinging drive module comprises a motor gear component, a swinging table, an optical adaptor, a swinging connecting flange, a push rod, a push rod assembling part, a push rod pin and a mirror pin; the swinging drive module is mainly for controlling the mirror to rotate by a certain angle, so as to realize small-range accurate scanning of the probe. The rotation drive module comprises a rotation table, a rotation motor, a rotation table mounting plate, a rotation optical sleeve, a plano-convex focusing lens, an infrared detector and a detector mounting plate; the rotation drive module is mainly for controlling the probe to circumferentially scan the surface of the turbine components. Optionally, the infrared detector can be replaced with a six-detector unit, so as to realize a technical effect of six-waveband temperature measurement. The translational drive module comprises a high-inertia servo motor, a plum coupling, a screw, a sliding table, limit switches and a sliding table base; the translational drive module is mainly for controlling the probe to radially scan the surface of the turbine components. Through the swinging drive module, the rotation drive module and the translational drive module, from the circumferential direction and the radial direction, three-dimensional panoramic scanning of the internal components of the turbine is realized, thereby realizing temperature measurement of multiple components inside the turbine.

The present invention is further illustrated with the accompanying drawings and the preferred embodiment as follows.

Referring to FIG. 1, the probe cover 6 is a two-way hollow Inconel-600 pipe and has a three-section structure, wherein: a top section is the thinnest, and other two sections are sequentially thicker; outer diameters of the three sections are respectively 14 mm, 16 mm and 21 mm. The three-section structure of the probe cover can effectively reduce a contact area between the probe and the hot airflow. The mirror 5 is a surface-polished nickel-based high-temperature resistant metal mirror with an inclined angle of 45°, wherein a diameter of the mirror is 8 mm. The light pipe 7 has an outer diameter of 7.9 mm and a total length of 270 mm. The optical lens set with a diameter of 4.4 mm is fastened inside the light pipe; light from the blade surface is reflected into interior of the light pipe through the mirror 5; after focusing and collimating by an optical system, light is transmitted to the driving device 4 at the rear end. The driving device comprises a swinging drive module 14, a rotation drive module 23 and a translational drive module 20.

Figure 2:
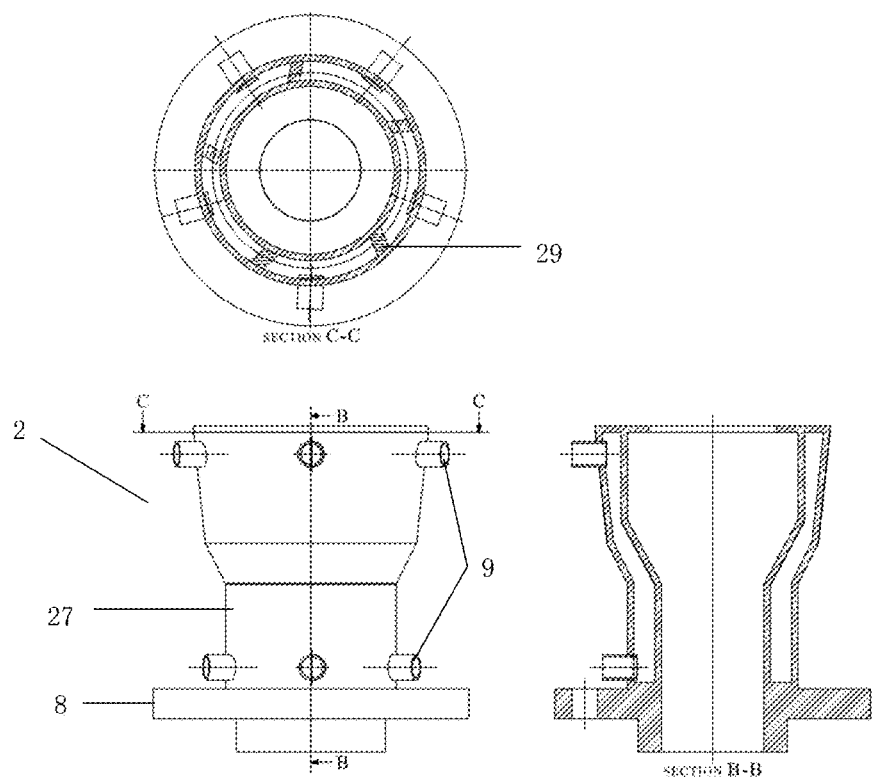
FIG. 2 shows a front view and sectional views in different directions of a cooling device according to the present invention.
Figure 3:
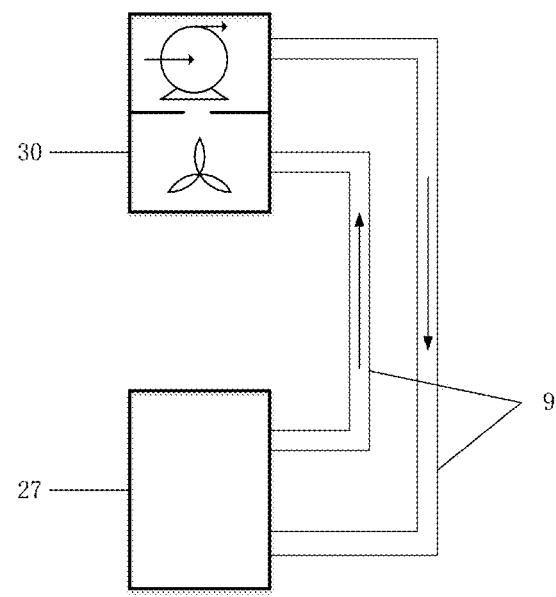
FIG. 3 is a working schematic diagram of a cooling device according to the present invention.

Referring to FIG. 2 and FIG. 3, the cooling device 2 comprises water-cooling pipelines 9, a connecting plate 10, a mounting flange plate 8, a cooling stage 27 with a cavity, and a cooling pond 30, wherein: the water-cooling pipelines 9 are connected to the cooling stage 27; a diameter of each water-cooling pipeline 9 is 6.5 mm; each of the water-cooling pipelines comprises an inlet pipe and an outlet pipe, and totally five water-cooling pipelines are arranged on one side of the cooling stage; the cooling stage is a cavity with a wall thickness of 1.5 mm, and five separation columns 29 are arranged inside the cavity; that is to say, there are totally five cooling cavities inside the cooling stage; one end of each water-cooling pipeline is connected to one cooling cavity, and the other end of each water-cooling pipeline is connected to the cooling pond 30; through the water-cooling pipelines, hot water in each cooling cavity is pumped into the cooling pond and cooled; the cooled water is pumped into each cooling cavity again to keep cooling the probe, so that a water-cooling circulation is formed for continuously cooling the probe. Furthermore, the cooling pond is separated into five independent parts which are respectively connected to the five water-cooling pipelines to provide five water-cooling circulations at the same time, which ensures that the cooling device can sufficiently cool the probe and realize higher efficiency than a single water-cooling circulation device. One end of the cooling stage is connected to the connecting plate 10 which connects the cooling device with the probe casing; and the other end of the cooling stage is connected to the mounting flange plate 8 which mounts the whole temperature measuring device on an engine casing.

Figure 4:
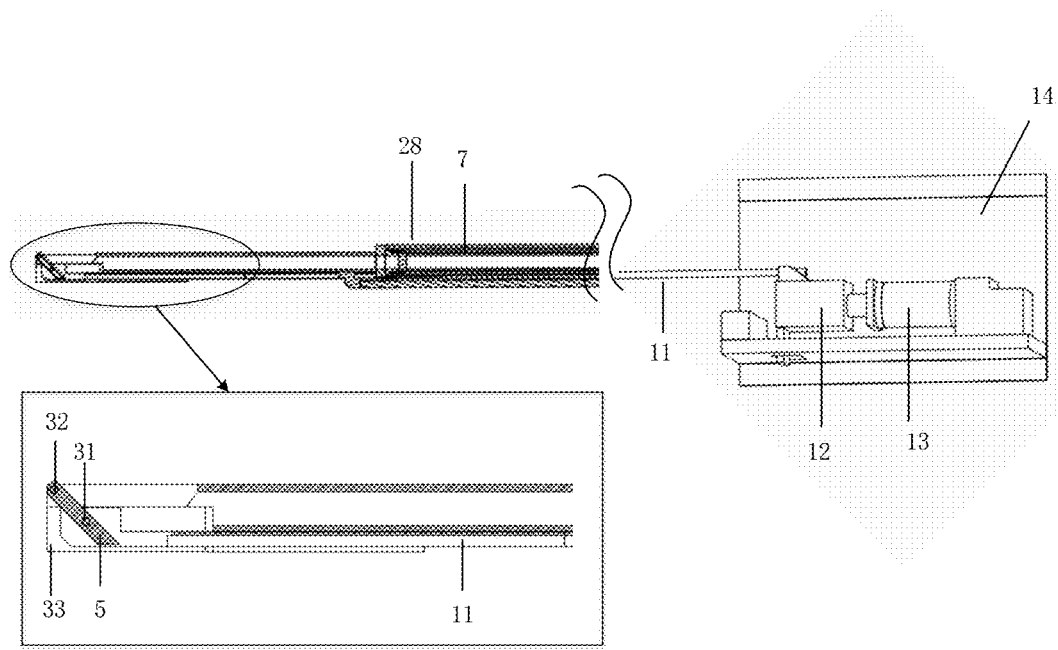
FIG. 4 shows sectional views of a swinging drive module and a sight pipe according to the present invention.

Referring to FIG. 4, the swinging drive module 14 comprises a motor gear component 13, a swinging table 12, an optical adaptor 24, a swinging connecting flange 25, a push rod 11, a push rod assembling part 33, a push rod pin 31, and a mirror pin 32, wherein: the motor gear component is connected to the swinging table, so that the swinging table can move back and forth; the push rod has a length of 300 mm; one end of the push rod, with a diameter of 3 mm, is arranged at a top part of the swinging table and driven to move by the motor gear component; a pin groove is provided on a top part of the other end of the push rod; the pin groove has a diameter of 1 mm and a length of 5 mm; one end of the mirror 5 is connected to the push rod pin and placed in the pin groove; the other end of the mirror is connected to the push rod assembling part through the mirror pin; the push rod pin and the mirror pin are both stainless columns with a diameter of 1 mm and a length of 8.5 mm; the push rod assembling part has a length of 100 mm; the push rod 12, the push rod assembling part 33, the mirror 5, the push rod pin 31 and the mirror pin 32 constitute a hinge structure together; when the swinging table moves back and forth, the mirror correspondingly rotates, realizing small-range accurate scanning of the probe.

Figure 5:
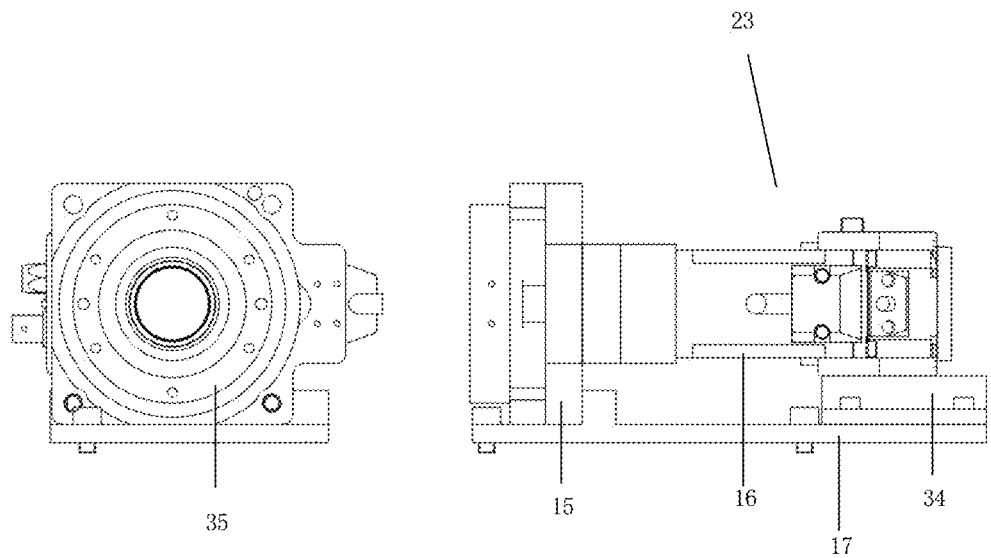
FIG. 5 is a sketch view of a rotation drive module according to the present invention.

Referring to FIG. 5, the rotation drive module 23 comprises a rotation table 15, a rotation motor 16, a rotation table mounting plate 17, a rotation optical sleeve 22, an infrared detector 21 and a detector connecting plate 34, wherein: a gear engagement component is arranged inside the rotation table; one end of the rotation table is connected to an output shaft of the rotation motor, and the rotation motor drives the gear engagement component inside the rotation table to rotate; a disc flange with screw holes and locating hole is arranged at the other end of the rotation table; when the rotation motor drives the gear engagement component to rotate, the disc flange rotates with the gear engagement component; the disc flange has a diameter of 70 mm and is provided with six M4 screw holes, for fixing the disc flange with the swinging connecting flange 25, so that the rotation drive module with the probe 1 is connected to the swinging drive module 14 through bolts. The rotation motor can drive the swinging drive module 14 with the probe 1 to rotate by an arbitrary angle through the disc flange, so as to realize circumferential scanning of surfaces of different components inside the turbine. Furthermore, the rotation optical sleeve is arranged behind the rotation table and is coaxial with the optical adaptor 24 and the light pipe, sharing the same light path. The rotation optical sleeve is an optical sleeve for a standard one-inch lens and has a length of 100 mm. A one-inch plano-convex focusing lens is fastened inside the rotation optical sleeve, for limiting a light path and introducing light into a detection unit of the detector. An external thread of the rotation optical sleeve matches with an internal thread of the infrared detector 21, so that the rotation optical sleeve and the infrared detector are arranged on the detector connecting plate 34 together.

Figure 6:
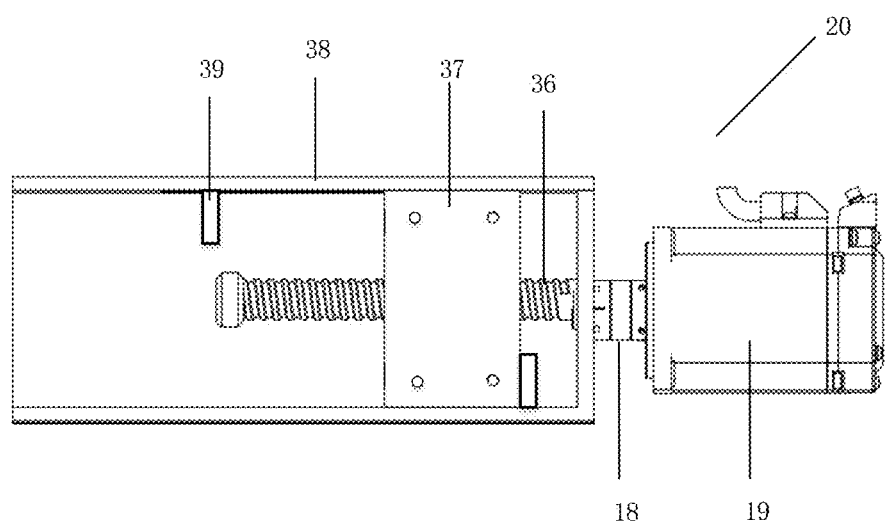
FIG. 6 is a sketch view of a translational drive module according to the present invention.

Referring to FIG. 6, the translational drive module 20 comprises a high-inertia servo motor 19, a plum coupling 18, a screw 36, a sliding table 37, limit switches 39 and a sliding table base 38, wherein: one end of the plum coupling is connected to an output shaft of the high-inertia servo motor, and the other end of the plum coupling is connected to the screw; the screw passes through the sliding table and is arranged on a bottom surface of the sliding table base with a center of the sliding table base; a center of the sliding table is provided with a right-handed internal thread which has a major diameter of 17 mm, a minor diameter of 15 mm, a thread pitch of 5 mm, an angle of 50°, and a length of 24 mm; the screw is a specific external-thread screw matching with the right-handed internal thread. The limit switches are respectively arranged on inner sides of the sliding table base, for limiting translation of the sliding table. The high-inertia servo motor drives the screw to rotate through the plum coupling; through thread engagement transmission, the sliding table axially moves along the screw; once the sliding table contacts with the limit switches, a reverse drive is given to the high-inertia servo motor immediately, so that the sliding table reversely moves.

What is claimed is:

1. A self-cooled four-shaft turbine panoramic temperature measuring device, comprising: a probe, a cooling device, a driving device and a probe casing, wherein: one end of the probe extends into the probe casing, and the other end of the probe is protruding; the cooling device is arranged at a connection part between the probe and the probe casing, for cooling the probe; the driving device is arranged inside the probe casing, for driving the probe to move; the probe comprises a probe cover, a sight pipe, a light pipe, and an optical lens set, wherein: the probe cover is arranged at an outermost portion of the probe, for protecting internal optical components of the probe; the sight pipe is arranged inside the probe cover, and the light pipe is welded inside the sight pipe; the sight pipe further protects the internal light pipe, which prevents the light pipe from directly contacting with a high-temperature airflow and contaminated particles; and the optical lens set is fastened inside the light pipe to form an optical system of a detection device, so that light is introduced from a turbine blade and detected; a rear end of the probe is connected to the driving device; the driving device comprises a swinging drive module, a rotation drive module, and a translational drive module, wherein: the rotation drive module drives the swinging drive module and the probe; and the translational drive module drives the rotation drive module, the swinging drive module and the probe; the optical lens set comprises a mirror, wherein the mirror is arranged at a tail end of the probe and hinged with the tail end of the probe through a mirror pin;

the cooling device comprises water-cooling pipelines, a connecting plate, a mounting flange plate, a cooling stage and a cooling pond, wherein: the water-cooling pipelines are connected to the cooling stage; each of the water-cooling pipelines comprises an inlet pipe and an outlet pipe, and totally five water-cooling pipelines are arranged on one side of the cooling stage; one end of each water-cooling pipeline is connected to a cooling cavity of the cooling stage where cooling water is circulated; adjacent cooling cavities are separated with a separation column; the other end of each water-cooling pipeline is connected to the cooling pond; through the water-cooling pipelines, hot water in each cooling cavity is pumped into the cooling pond and cooled; the cooled water is pumped into each cooling cavity again to keep cooling the probe, so that a water-cooling circulation is formed for continuously cooling the probe; the cooling pond is separated into five independent parts which are respectively connected to the five water-cooling pipelines to provide five water-cooling circulations at the same time; one end of the cooling stage is connected to the connecting plate which connects the cooling device with the probe casing; and the other end of the cooling stage is connected to the mounting flange plate which mounts the whole temperature measuring device on an engine casing;

the swinging drive module comprises a motor gear component, a swinging table, an optical adaptor, a swinging connecting flange, a push rod, and a push rod assembling part, wherein: one end of the swinging connecting flange is fixed on a disc flange of the rotation drive module, and the other end of the swinging connecting flange is fixed with a probe flange through a cushion; the probe flange is fixed with the probe; a light exit end of the probe is connected to a rotation optical sleeve of the rotation drive module through the optical adaptor; the probe, the optical adaptor, the rotation optical sleeve and an infrared detector are coaxially arranged; an output section of the motor gear component is connected to the swinging table, so that the swinging table is movable along a length direction of the probe; the swinging table is connected to one end of the push rod, and the other end of the push rod is connected to the push rod assembling part; the push rod is arranged inside the probe cover; the push rod assembling part is connected to the mirror through a push rod pin;

the rotation drive module comprises a rotation table, a rotation motor, a rotation table mounting plate, the rotation optical sleeve, the infrared detector and a detector mounting plate, wherein: a lower surface of the rotation table mounting plate is fixed on a sliding table of the translational drive module; the rotation motor is arranged on an upper surface of the rotation table mounting plate at an edge of one side along a movement direction of the sliding table of the translational drive module; the infrared detector is arranged on a rest part of the upper surface of the rotation table mounting plate through the detector mounting plate; a detection point of the infrared detector is located on a translational axis of the rotation table mounting plate; the rotation table has a hollow circular portion, and a gear engagement component is arranged inside the hollow circular portion; one side of the hollow circular portion of the rotation table is connected to an output shaft of the rotation shaft, and the rotation motor drives the gear engagement component inside the rotation table to rotate; the disc flange is arranged at the other side of the rotation table, and a light transmitting hole is provided at a center of the disc flange; when the rotation motor drives the gear engagement component to rotate, the disc flange rotates with the gear engagement component; the disc flange is connected to the swinging drive module through bolts; one end of the rotation optical sleeve is connected to the infrared detector, and the other end of the rotation optical sleeve passes through the hollow circular portion of the rotation table;

the translational drive module comprises a high-inertia servo motor, a plum coupling, a screw, the sliding table, limit switches and a sliding table base, wherein: one end of the plum coupling is connected to an output shaft of the high-inertia servo motor, and the other end of the plum coupling is connected to one end of the screw; the other end of the screw passes through the sliding table; the sliding table is placed in the sliding table base; the limit switches are arranged on inner sides of the sliding table base, respectively corresponding to initial and final positions of translation of the sliding table; the high-inertia servo motor drives the screw to rotate through the plum coupling, and the sliding table axially moves along the screw; once the sliding table contacts with the limit switches, a reverse drive is given to the high-inertia servo motor immediately, so that the sliding table moves reversely.

* * * * *